United States Patent [19]

Yannopoulos et al.

[11] 4,094,668
[45] June 13, 1978

[54] TREATMENT OF COPPER REFINERY SLIMES

[75] Inventors: John C. Yannopoulos, Danbury, Conn.; Borham M. Borham, Great Falls, Mont.

[73] Assignee: Newmont Exploration Limited, Danbury, Conn.

[21] Appl. No.: 798,564

[22] Filed: May 19, 1977

[51] Int. Cl.² .............................................. C22B 11/00
[52] U.S. Cl. ........................................ 75/99; 75/101 R; 75/101 BE; 75/103; 75/104; 75/109; 75/110; 75/112; 75/114; 75/115; 75/118 R; 423/509
[58] Field of Search ................. 75/99, 101 BE, 101 R, 75/103, 104, 109, 110, 112, 114, 115, 118; 423/509

[56] References Cited

U.S. PATENT DOCUMENTS

| 3,658,510 | 4/1972 | Hoffmann et al. | 75/99 |
| 4,047,939 | 9/1977 | Morrison | 75/99 |

Primary Examiner—M. J. Andrews
Attorney, Agent, or Firm—Pennie & Edmonds

[57] ABSTRACT

The gold, silver and selenium content of copper refinery slimes are recovered by first leaching the slimes with dilute sulfuric acid at an elevated temperature and at a partial pressure of oxygen of between about 5 and 50 psig. to obtain a leach solution containing at least about 98% of the copper content of the raw slimes. The decopperized leach residue is dried and then roasted in an oxidizing atmosphere at a temperature of about 400° to 800° C. to obtain effluent roaster gases containing substantially all of the selenium content of the raw slimes in the form of selenium dioxide, the effluent roaster gases being treated to recover the selenium dioxide content thereof. The deselenized roaster residue is mixed with dilute acid and ferric chloride to form a slurry through which chlorine gas and air are continuously bubbled for a period of at least about 5 hrs. to obtain an extraction liquor containing the gold content and a chlorination residue containing the silver content of the raw slimes. The auric chloride-containing extraction liquor is then treated to recover the gold content thereof, and the silver chloride containing chlorination residue is treated to recover the silver content thereof in pure metallic form.

4 Claims, 4 Drawing Figures

TREATMENT OF COPPER REFINERY SLIMES

BACKGROUND OF THE INVENTION

1. Field of the Invention

This invention relates to a process for the recovery of the gold, silver and selenium content of copper refinery slimes.

2. Prior Art

Copper refinery slimes are the insoluble residues from the anodic dissolution of anode copper that settle and accumulate as "anode mud" at the bottom of electrolytic copper refining cells. These insoluble metals and compounds comprise varying amounts of copper, silver, gold and selenium together with lead, tellurium, traces of platinum group metals, sulfur and other elements, depending on the initial composition of the copper ore and its subsequent treatment, and are a valuable byproduct of the electrolytic refining of copper.

The slimes are treated by various processes to recover the precious metals and other valuable constituents. As the composition of the slimes produced at various refineries varies considerably there is usually a considerable difference in the slime treatment flow sheet employed by each refinery. However, in almost all of the slime treatment processes heretofore employed the slimes are subjected to various pyrometallurgical refining steps to remove most of the non-precious metal constituents of the slimes and to obtain an impure gold-silver alloy known as Dore metal. The Dore metal is then subjected to an electrolytic refining operation to recover a relatively pure silver deposit at the cathode and a gold-rich anode mud that is further refined to obtain a pure gold product. In all of these prior art processes involving multiple pyrometallurgical refining steps there is significant recycling of metal-rich slags, and the the relatively large amount of material being processed and recycled represents a high inventory cost of precious metals tied up in the process.

After an intensive investigation into the problems and limitations of conventional processes for the treatment of copper refinery slimes, and in particular slimes of relatively high selenium content, we have now devised a new process for the treatment of these slimes that provides a clean separation of the valuable constituents of the slimes without tying up large amounts of these valuable constituents in metal-rich slags that must be recycled through the process. Our new process involves the removal of copper from the raw slimes by acid leaching under oxygen pressure, the removal and recovery of selenium by oxidation and volatilization, and the parting and refining of the silver and gold content of the decopperized and deselenized slime residue by hydrometallurgical procedures. Moreover, the process results in high recoveries of the selenium, silver and gold content of the slimes in pure form without significant recycling of or multiple purifying steps for the selenium and the precious metals.

SUMMARY OF THE INVENTION

Our new process for the recovery of the gold, silver and selenium content of copper refinery slimes comprises treating the raw slimes with a dilute solution of sulfuric acid at an elevated temperature and at a partial pressure of oxygen of between about 5 to 50 lbs. per square inch gauge to obtain an acidic leach solution containing at least about 98% by weight of the copper content and about 30% of the tellurium content of the raw slimes and to obtain a decopperized leach residue containing the gold, silver and selenium content of the raw slimes. The copper-containing leach solution is separated from the decopperized leach residue and is treated to recover the copper content thereof. The decopperized leach residue is dried and then is roasted in an oxidizing atmosphere at a temperature of about 400° to 800° C. for at least about 4 hours to obtain effluent roaster gases containing the selenium content of the raw slimes in the form of selenium dioxide and to obtain a deselenized roaster residue containing the gold and silver content of the raw slimes. The effluent roaster gases are treated to recover the selenium dioxide content thereof, advantageously by scrubbing the roaster gases with alkaline water to obtain an alkali metal selenite scrubber solution from which commercial grade selenium is precipitated and recovered. Dilute hydrochloric acid or nitric acid and ferric chloride are mixed with the roaster residue to obtain a slurry containing about 5% to 50% by weight solids, and chlorine gas and air are continuously bubbled through the slurry at a temperature of between about 25° to 90° C. for a period of at least about 5 hours to obtain an extraction liquor containing the gold and residual selenium content of the raw slimes and a solid residue containing the silver content of the raw slimes. The chlorination reaction mixture is cooled and the chlorination extraction liquor is separated from the solid chlorination residue, the extraction liquor being treated to recover the gold content thereof and the chlorination residue being treated to recover the silver content thereof.

The chlorination residue is mixed with water to form a slurry that is heated to about 40° to 65° C., the slurry then being filtered to recover a hot aqueous filtrate containing the water soluble metal chloride content of the residue and to obtain a solid filter cake containing the silver chloride content of the residue. The filter cake is then leached with an aqueous solution of ammonia and ammonium sulfate to extract the silver therefrom in the form of an ammoniacal ammonium sulfate silver chloride complex. The ammoniacal extraction solution is recovered and then is treated with sulfuric acid to precipitate pure silver chloride therefrom, and the pure silver chloride is recovered and reacted with metallic zinc to obtain pure metallic silver which is recovered as a product of the process.

In one embodiment of the process the gold-containing extraction liquor from the chlorination step is percolated through a bed of granular activated carbon to adsorb the auric chloride complexes and to reduce these complexes to metallic gold on the surface of the carbon. The gold containing activated carbon is washed first with water and then with dilute nitric acid to remove substantially all metal ions except gold from the activated carbon. The gold-containing carbon is leached with a mixture of hydrogen peroxide and nitric acid to dissolve the gold content of the activated carbon, and the gold-containing leach liquor is treated with oxalic acid to precipitate pure gold therefrom that is recovered as a product of the process. In another embodiment of the process the gold-containing aqueous extraction liquor from the chlorination step is mixed with a water immiscible organic solvent for auric chloride to obtain an organic phase containing the gold in the form of auric chloride and its complexes. The gold-containing organic phase is recovered and then is mixed with a reversing agent and water to extract the gold content thereof and to obtain a gold-containing aqueous solution, the gold-containing aqueous solution being treated with oxalic acid to precipitate pure metallic gold therefrom that is recovered as a product of the process.

The copper-containing acidic leach liquor and other by-product streams are treated to recover the copper, tellurium, and platinum group metal content thereof in the manner hereinafter more fully explained. Thus, all of the valuable constituents of the copper refinery slimes are recovered without repeated complicated and costly pyrometallurgical operations which tie up substantial amounts of precious metals in the material being processed.

BRIEF DESCRIPTION OF THE DRAWINGS

Our improved process for the treatment of copper refinery slimes will be better understood from the following description in conjunction with the accompanying drawings of which.

DETAILED DESCRIPTION

The composition of the anode slimes produced at various copper refineries varies considerably, depending on the initial composition of the copper ore and its subsequent treatment. In general, the slimes comprise various amounts of copper, silver, gold and selenium together with lead, tellurim, platinum group metals, and other elements. The present process is particularly suitable for use with copper refining slimes containing significant amounts of selenium as well as gold and silver.

Figure 1:
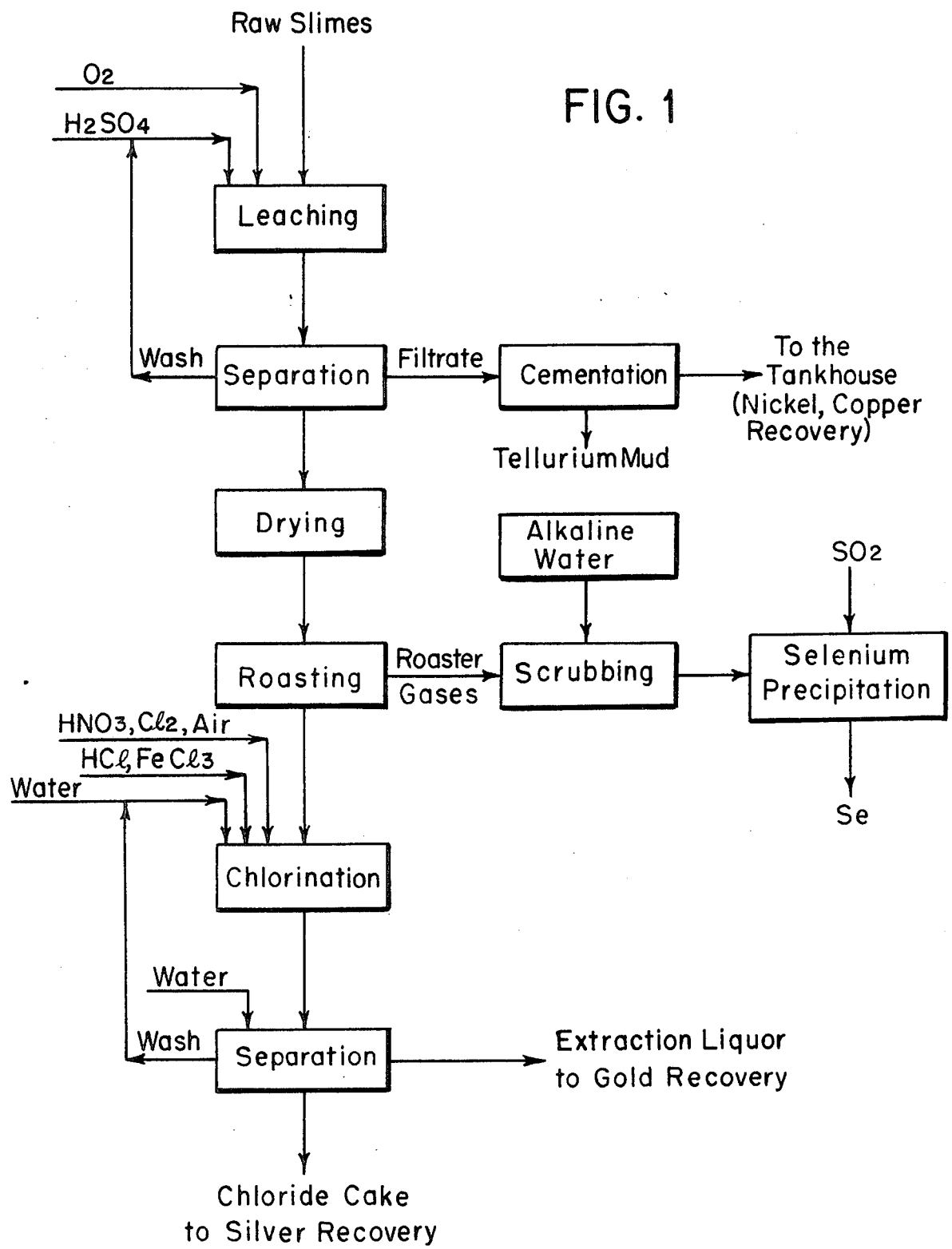
FIG. 1 is a schematic flow sheet of the process from the leaching of the slimes through the chlorination of the decopperized and deselenized slime residue.

As shown in FIG. 1 of the drawings, the raw slimes recovered from the copper refining cells are first subjected to an acidic leach operation at an elevated temperature and under moderate oxygen pressure to dissolve and extract the copper content and a portion of the tellurium content of the slimes. Advantageously, the slimes are introduced into an autoclave where they are mixed with dilute sulfuric acid (containing from about 50 to 350 grams per liter $H_2SO_4$) or depleted electrolyte from the copper refinery tankhouse. The mixture is heated to between about 40° to 100° C. and oxygen is introduced into the autoclave to maintain a partial pressure of oxygen therein of between about 5 to 50 pounds per square inch gauge (psig) for a period of about 1 to 7 hours, depending upon the composition of the slimes and the leach medium. On completion of the leach operation more than about 98% of the copper content of the slimes and about 30% of the tellurium content of the slimes are converted to the corresponding metal sulfates in solution in the leach liquor.

The copper and tellurium containing leach liquor is separated from the decopperized leach residue, advantageously by filtration, and is treated to recover the tellurium and copper content thereof. The tellurium is advantageously recovered by means of a cementation operation in which the leach liquor is brought into contact with metallic copper scrap to precipitate metallic tellurium thereon that is recovered as a by-product of the process. The tellurium-free leach liquor is then returned to the copper refinery tankhouse for recovery of the copper content of the solution.

The decopperized leach residue is dried to remove excess moisture and then is subjected to a roasting operation to oxidize and to volatilize the selenium content of the slimes. Advantageously, the dried leach residue is pelletized in a disc or drum pelletizer to obtain roughly spherical pellets of about ⅜ to ⅝ inch in diameter. The green pellets are then heated in an oxidizing atmosphere at a sufficient temperature and for a sufficient period of time to volatilize and thus remove from the roasted pellets substantially all of the selenium content of the slimes. We presently prefer to employ a chain roaster in which the pellets are heated indirectly, advantageously by means of radiant tubes or the like, air that infiltrates into the roaster providing the required oxidizing atmosphere therein, although other types of roasters can obviously be employed. The pellets are heated for more than about 4 hours at a temperature of about 400° to 800° C. to insure the substantially complete volatillization of the selenium content of the slimes which is removed in the form of selenium dioxide gas or fumes along with the effluent roaster gases.

The effluent roaster gases containing the volatilized selenium dioxide are subjected to a scrubbing operation with alkaline water to produce an aqueous scrubber solution containing the selenium content of the roaster gases in the form of sodium selenite or an equivalent alkali metal or alkali earth metal selenite. The selenium-containing scrubber solution is then treated with sulfur dioxide gas to precipitate commercial grade selenium therefrom which is recovered as a valuable product of the process.

The decopperized and deselenized solid residue from the roasting operation is then subjected to a chlorination operation to obtain a chlorination extraction liquor containing the gold content and a chlorination extraction residue containing the silver content of the slimes. The roaster residue is mixed with 3-8M hydrochloric acid or nitric acid to obtain a pulp or slurry containing 5-50 % by weight solids. Ferric chloride in an amount comprising from about 1 to 3% by weight of the roaster residue is mixed with the slurry, and air and chlorine gas are continuously bubbled through the slurry mixture which is maintained at a temperature of between about 25° to 90° C. The chlorination operation is continued for a sufficient period of time, advantageously for at least about 5 hours. On completion of the chlorination operation the mixture is cooled slowly under agitation to a temperature of about 20° C. or below and then is filtered to recover the chlorination extraction liquor containing the gold content of the slimes and the chlorination extraction residue containing the silver content of the slimes.

Figure 2:
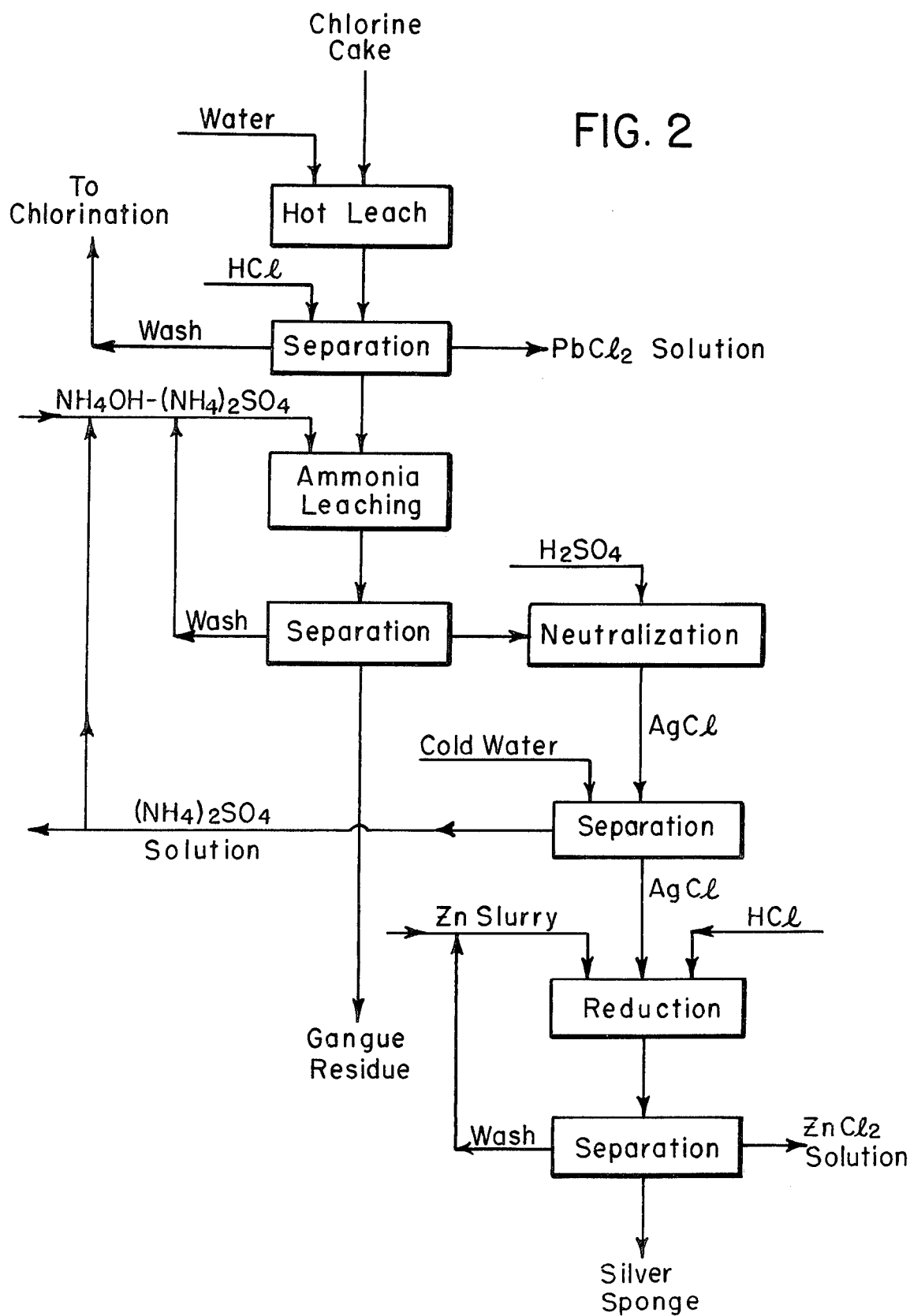
FIG. 2 is a schematic flow sheet of the procedure employed to recover pure silver from the solid chlorination residue.

As shown in FIG. 2 of the drawings, the solid chlorination extraction residue is mixed with water to obtain a slurry containing about 5% to 35% by weight solids, and the slurry is heated to a temperature of about 40° to 65° C. to dissolve and extract the lead content thereof. The slurry is filtered while still hot to remove the water soluble metal chlorides (principally, lead chloride) in the filtrate. The silver chloride-containing filter cake is washed with a dilute solution of hydrochloric acid (advantageously containing about 0:15 g/l HCl) to remove the remaining traces of lead chloride therefrom, the chloride-containing wash liquid being recycled to the chlorination step of the process.

The lead-free filter cake is leached with a hot ammoniacal solution of ammonium sulfate (advantageously comprising about 10 M $(NH_4)_2SO_4$ in a 10% aqueous ammonia solution) to dissolve and extract the silver chloride from the leach residue. The silver containing ammoniacal-ammonium sulfate leach liquor is separated from the leach residue and recovered, the leach residue being washed and then discarded and the wash water being recycled through the process. The ammoniacal solution of silver diammine chloride is treated, advantageously with dilute sulfuric acid, to precipitate substantially all of the silver content thereof in the form of pure silver chloride. The silver chloride precipitate is recovered by filtration and is washed with cold water. Alternatively silver chloride could be precipitated by direct volatilization of the ammonia as shown in FIG. 2.

The washed silver chloride filter cake is mixed with an additional quantity of pure water to obtain a slurry containing about 20% by weight solids. A suspension of pure zinc powder in pure water is prepared, and an amount of zinc stoichmetrically equivalent to the silver chloride content of the slurry is added to obtain pure silver in accordance with the following equation.

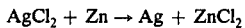

$$AgCl_2 + Zn \rightarrow Ag + ZnCl_2$$

The silver chloride and zinc powder mixture is stirred for about 1-5 hours to insure complete conversion of all of the silver chloride to metallic silver, and then a small quantity of hydrochloric acid is added thereto to convert any residual metallic zinc to zinc chloride. The mixture is filtered and the zinc chloride is removed with the filtrate, the sponge silver filter cake being washed and then dried to recover a substantially pure silver product.

Figure 3:
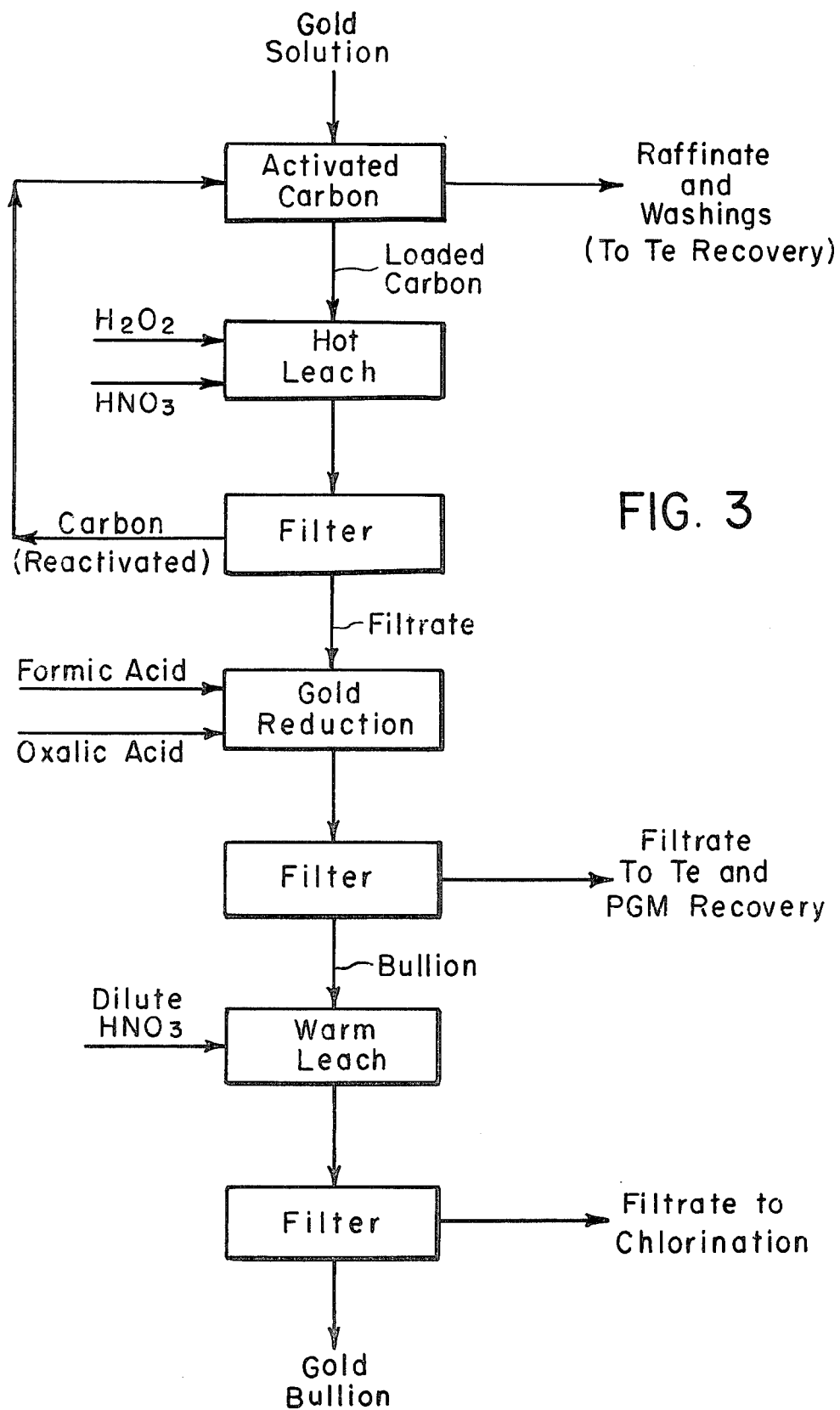
FIG. 3 is a schematic flow sheet of one advantageous procedure for the recovery of pure gold from the chlorination extraction liquor.

The treatment of the chlorination extraction liquor to recover the gold content thereof in accordance with our process will depend upon the original composition of the slimes. Extraction liquor derived from slimes having a relatively high content (that is, more than about 3%) of tellurium arsenic, antimony, bismuth and platinum group metals is percolated through a bed of activated carbon as shown in FIG. 3. Gold chloride complexes are completely and selectively adsorbed and reduced to metallic gold on the surface of the carbon. Extraction liquor derived from slimes containing a significant amount of the aforementioned elements is subjected to a solvent extraction operation as shown in FIG. 4 to obtain an aqueous solution of auric chloride from which pure metallic gold is recovered.

In the gold recovery procedure shown in FIG. 3 of the drawings the extraction liquor is percolated bottom-to-top through a bed of activated carbon contained in the first of several substantially identical adsorption towers, the rate of flow of the extraction liquor through the bed advantageously being about 1-10 gallon per minute per square foot of the cross section of the bed. Auric chloride complexes are adsorbed selectively and are reduced to metallic gold on the surface of the activated carbon, the gold-free extraction solution or effluent from the adsorption tower being treated for the recovery of the tellurium and platinum group metal content thereof. When traces of gold are detected in the effluent from the first adsorption tower the flow of chlorination extraction liquor thereto is interrupted and the extraction liquor is introduced into a second adsorption tower containing fresh, or freshly regenerated, activated carbon. The bed of carbon in the first tower is washed with cold pure water which is recycled to the chlorination step of the process. The bed is then washed with hot (90°–100° C) pure water and with at least one bed volume of 2–4M nitric acid solution to dissolve and remove any co-adsorbed impurities. The metallic gold-containing carbon bed is then removed from the tower to a leach vessel where it is leached with hot hydrogen peroxide -nitric acid mixture to dissolve the metallic gold deposited on the surface of the carbon particles. The resulting gold-containing acidic leach solution is separated from the carbon and is then treated with oxalic acid to precipitate pure metallic gold (996 to 999 fine) therefrom which is recovered as a valuable product of the process.

Figure 4:
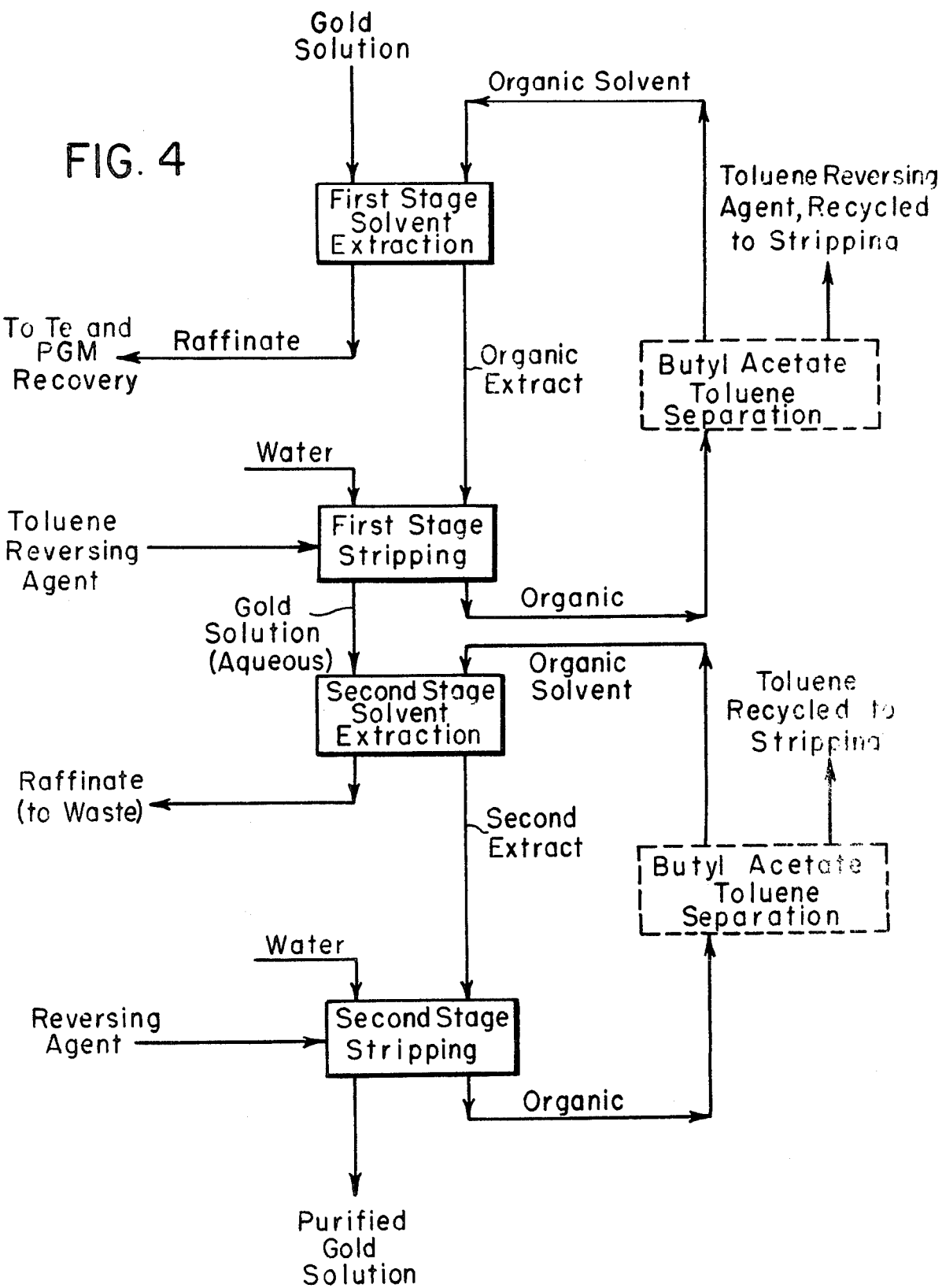
FIG. 4 is a schematic flow sheet of another advantageous procedure for the recovery of pure gold from the chlorination extraction liquor.

In the gold recovery procedure by solvent extraction shown in FIG. 4 of the drawings the auric chloride containing extraction liquor is introduced into a first mixing and settling tank where it is mixed with a water-immiscible organic solvent for auric chloride and auric chloride complexes. The organic solvent advantageously is a solution of an active solubilizing agent for auric chloride and its complexes in a diluent water-immiscible carrier. Solutions of ethyl ether, or butyl ether, or ethyl acetate, or dibutyl carbitol in toluene, as well as other known solvents for gold chlorides can be used to advantage. In the preferred practice of the process the organic solvent comprises a solution containing butyl acetate in toluene, and the ratio of organic solvent solution to the aqueous extraction liquor is about 2 to 1 by volume. After thorough mixing to insure the substantially complete transfer of the gold from the aqueous extraction liquor to the organic solvent solution, the aqueous and organic phases are allowed to separate and to settle into two immiscible layers. A portion of the gold-free aqueous phase is recycled to the chlorination step of the process, the remainder being treated for the recovery of the tellurium and platinum group metal (PGM) content thereof.

The gold-containing organic phase is introduced into a second mixing and settling tank where it is mixed with toluene and pure water to strip the gold from the organic phase. The auric chloride and auric chloride complexes dissolve preferentially in the pure water of the aqueous phase so that most of the dissolved gold is transferred from the organic solvent to the aqueous phase. The two phases are allowed to separate and to settle into two immiscible layers that are separately recovered. The organic phase containing the organic solvent solution greatly reduced in its auric chloride content is adjusted by distillation to the proper composition and then is recycled to the first mixing and settling tank where it is employed to extract the gold content of a fresh supply of the chlorination extraction liquor. Advantageously, two stages of solvent extraction are employed as shown in FIG. 4. Upon completion of the second stage of the extraction operation, the gold-containing aqueous phase is treated with oxalic acid to precipitate pure metallic gold (998 to 999 fine) therefrom which is recovered as a valuable product of the process.

The following example is illustrative but not limitative of the practice of our invention:

Copper refinery slimes containing approximately 11.8% Ag, 0.52% Au, 25.6% Se, 39.0% Cu, 0.71% Te, 1.6% Pb, and trace amounts of platinum group metals (PGM) were introduced into an autoclave and were leached with dilute sulfuric acid (200 g/l $H_2SO_4$) at a temperature of about 95° C. under a partial pressure of oxygen of about 20 psig for a period of about 3 hours. On completion of the leaching operation the leach liquor was separated from the decopperized leach residue by filtration. Better than 99.5% of the copper content and about 30% of the tellurium content of the raw slimes were extracted from the slimes during the leach operation and were removed with the filtrate. The tellurium content of the leach liquor was recovered by cementation on metallic copper scrap, and the leach liquor was recycled to the refinery tankhouse for recovery of the copper content thereof.

The decopperized leach residue was dried to obtain about 4 to 6% by weight moisture content, and the dried residue was mixed with about 1 to 3% by weight bentonite and then pelletized in a disc pelletizer to obtain pellets of about ⅜ to ⅝ inch in size. The green pellets were introduced into a chain roaster heated indirectly with radiant tubes, air infiltrating into the roaster providing the required oxidizing atmosphere therein. The pellets were heated to a temperature of between about 400° to 800° C. for more than 4 hours in order to volatilize and convert the contained selenium to selenium dioxide. The effluent roaster gases containing the volatilized selenium dioxide were scrubbed with a dilute solution of sodium hydroxide to obtain a scrubber solution containing the selenium in the form of sodium selenite. Sulfur dioxide was then bubbled into the scrubber solution to precipitate commercial grade selenium therefrom which was recovered as a product of the process. The roasted residue contained approximately 45.6% Ag, 1.57% Au, 1.81% Se, 1.91% Cu, 1.48% Te, 4.10% Pb 0.024% Pd, 2.68% $Al_2O_3$ and 18.9% $SiO_2$.

The decopperized and deselenized roaster residue was mixed with 4M nitric acid to obtain a pulp or slurry containing about 20% by weight solids. An amount of ferric chloride comprising about 2% of the roaster residue and an amount of sodium chloride about 10% of the roaster residue were added. Chlorine gas and air were continuously bubbled therethrough, with agitation and at a temperature of between about 25° to 65° C., for a period of about 5 hours. The chlorination mixture was slowly cooled under agitation to about 20° C. and was filtered to obtain an extraction liquor containing the gold content of the slimes and a residue containing the silver content of the slimes. The chlorination residue contained 46.5% Ag, 0.16% Se, 0.04% Cu, 0.02% Te, 2.1% Pb. Neither gold nor PGM were detected in this residue.

The chlorination residue was mixed with water to obtain a slurry containing about 20% by weight solids. The slurry was heated to about 40° C. to dissolve the lead chloride content thereof, and was filtered while still hot to remove the lead chloride with the filtrate. The filter cake was washed with dilute hydrochloric acid containing 0.15 g/l HCl to remove the remaining traces of lead therefrom. The lead-free filter cake was then mixed with an ammoniacal ammonium sulfate solution comprising 10 M $(NH_4)_2SO_4$ in 10% aqueous ammonia to dissolve the silver chloride content of the leach residue. The silver chloridecontaining ammoniacal solution was separated from the remaining solid chlorination residue and, its pH was adjusted to pH about 1 with 10% sulfuric acid to precipitate pure silver chloride therefrom. The silver chloride precipitate was recovered by filtration, washed and then mixed with pure water to obtain a silver chloride slurry. A stoichiometric amount of pure zinc powder in the form of an aqueous suspension was added slowly to the silver chloride slurry with stirring to reduce the silver chloride to pure metallic silver. The metallic silver sponge product was washed with hydrochloric acid to dissolve and remove any residual traces of metallic zinc, and then was washed and dried to recover a pure silver product 955 fine.

A portion of the chlorination extraction liquor was percolated through a bed of granular activated carbon at the rate of about 8 gallon per minute per square foot of the cross-section of the bed. The auric chloride complexes in the extraction liquor were adsorbed and reduced to metallic gold on the surface of the activated carbon. The feed solution contained 1.40 gpl Au, 2.60 gpl Cu, 2.50 gpl Pb, 1.55 gpl Te, 1.40 gpl Se, 0.17 gpl Al, 0.06 gpl Fe, 0.03 gpl Si, 0.024 gpl Pd, and 0.02gpl Sb. Gold was adsorbed completely as well as the traces of palladium. Neither gold nor palladium could be detected in the effluent from the carbon column, whereas all impurities were not adsorbed to any significant extent. On completion of the adsorption operation the loaded carbon bed was washed with one bed volume of cold deionized water, then with two bed volumes of hot (90° C.) deionized water to remove any co-adsorbed tellurite, selenite, and platinum group metal ions, and again washed with one bed volumes of 3M hot nitric acid. Finally, the activated carbon was leached with hot mixture of hydrogen peroxide to dissolve the metallic gold deposited on the surface of the carbon. The acidic leach liquor was recovered and then treated with oxalic acid. Gold was quantitatively precipitated and had a fineness 988.

Another chlorination liquor, with 2.82 gpl Au, 0.37 gpl Pd, 0.18 gpl Pt and high content of selenium tellurium and base metal impurities, was introduced into a mixing and settling tank where it was mixed with a solution of 50% butyl acetate in toluene. After thorough mixing, the two phases were allowed to separate and to settle into two mutually immiscible liquid layers. The organic phase extracted the gold from the aqueous phase but did not extract at all the PGM tellurium, selenium and the base metal impurities. More toluene (reversing agent) was added to the pregnant organic phase and it was mixed with pure deionized water. Substantially all of the dissolved gold was stripped from the organic solution, and after the two immiscible phases were separated the dissolved gold was removed with the aqueous phase. The gold was precipitated with oxalic acid from the aqueous solution. The precipitation was quantitative and gold better than 991 fine was obtained.

We claim:

1. Process for the recovery of gold, silver and selenium from copper refinery slimes containing these metals which comprises:

treating the raw slimes with a dilute solution of sulfuric acid at a temperature of between about 40° and 100° C. and at a partial pressure of oxygen of between about 5 to 50 lbs. per square inch gauge to obtain a leach solution containing at least about 98% by weight of the copper content of the raw slimes and to obtain a decopperized leach residue containing the gold, silver and selenium content of the raw slimes, roasting the leach residue in an oxidizing atmosphere at a temperature of about 400° to 800° C. for at least about 4 hours to obtain effluent roaster gases containing the selenium content of the raw slimes in the form of selenium dioxide and to obtain a deselenized roaster residue containing the gold and silver content of the raw slimes, treating the effluent roaster gases to recover the selenium dioxide content thereof, adding dilute hydrochloric acid or nitric acid and ferric chloride to the roaster residue to obtain a slurry containing about 20% by weight solids, and continuously bubbling chlorine and air through the slurry at a temperature of between about 25° to 90° C. for a period of at least about 5 hours to obtain an extraction liquor containing the gold and residual selenium content of the raw slimes and a solid chlorination residue containing the silver content of the raw slimes, separating the chlorination extraction liquor from the solid chlorination residue, treating said extraction liquor to recover the gold content thereof and treating said chlorination residue to recover the silver content thereof.

2. The process according to claim 1 in which the solid chlorination residue from the chlorination step is mixed with water to form a slurry that is heated to about 40° to 65° C., said slurry then being filtered to remove a hot aqueous filtrate containing the water soluble metal chloride content of said chlorination residue and to obtain a solid filter cake containing the silver chloride content of said residue, in which the filter cake is then leached with an aqueous solution of ammonia and ammonium sulfate to extract the silver therefrom in the form of an ammoniacal ammonium sulfate silver chloride complex, in which the ammoniacal extraction solution is recovered and then is treated with sulfuric acid to precipitate pure silver chloride therefrom, and in which the pure silver chloride is recovered and reacted with metallic zinc to obtain zinc chloride and pure metallic silver that is recovered as a product of the process.

3. The process according to claim 1 in which the gold-containing extraction liquor from the chlorination step is percolated through a bed of granular activated carbon to adsorb the auric chloride complexes and to reduce these complexes to metallic gold on the surface of the carbon, in which the gold-containing activated carbon is washed first with water ahd then with dilute nitric acid to remove substantially all metal ions except gold from the activated carbon, in which the gold-containing carbon is leached with a mixture of hydrogen peroxide and nitric acid to dissolve the gold content of the activated carbon, and in which the gold-containing leach is treated with oxalic acid to precipitate pure gold therefrom that is recovered as a product of the process.

4. The process according to claim 1 in which the gold-containing aqueous extraction liquor from the chlorination step is mixed with a water immiscible organic solvent for auric chloride to extract the gold content thereof and to obtain an organic phase containing the gold in the form of auric chloride and its complexes, in which the gold-containing organic phase is recovered and then is mixed with water to extract the gold content thereof and to obtain a gold-containing aqueous solution, and in which the gold-containing aqueous solution is treated with oxalic acid to precipitate pure metallic gold therefrom that is recovered as a product of the process.

* * * * *